United States Patent
Arnold et al.

(10) Patent No.: US 6,491,221 B1
(45) Date of Patent: Dec. 10, 2002

(54) SECURITY DOCUMENTS

(75) Inventors: David Howard Arnold, Surrey (GB); Michael David Crossfield, Cambridge (GB); Michael John Abrams, Hampshire (GB)

(73) Assignee: Flying Null Limited, Harston (GB)

( * ) Notice: Subject to any disclaimer, the term of this patent is extended or adjusted under 35 U.S.C. 154(b) by 0 days.

(21) Appl. No.: 09/567,967

(22) Filed: May 10, 2000

Related U.S. Application Data

(63) Continuation of application No. PCT/GB98/03417, filed on Nov. 13, 1998.

(30) Foreign Application Priority Data

Nov. 13, 1997 (GB) .............................. 9724021

(51) Int. Cl.⁷ ................................. G06K 7/08
(52) U.S. Cl. ....................... 235/449; 235/493
(58) Field of Search ................. 235/379, 487, 235/449, 440, 493, 491; 283/57, 58, 59; 705/35

(56) References Cited

U.S. PATENT DOCUMENTS

| | | | |
|---|---|---|---|
| 4,218,674 A | 8/1980 | Brosow et al. | 340/149 A |
| 4,518,919 A * | 5/1985 | Ishida | 324/228 |
| 4,838,791 A * | 6/1989 | Bogosian, Jr. et al. | 434/116 |
| 5,917,930 A * | 6/1999 | Kayani et al. | 382/135 |

FOREIGN PATENT DOCUMENTS

| | | | |
|---|---|---|---|
| EP | 0 710 934 A2 | 8/1996 | G07D/7/00 |
| GB | 2316521 * | 2/1998 | G07D/7/00 |
| WO | WO 96/08012 | 3/1996 | G11B/23/28 |
| WO | WO 96/35586 | 11/1996 | B42D/15/00 |
| WO | WO 97/35403 | 9/1997 | H04L/9/32 |
| WO | WO 97/39428 | 10/1997 | G07D/7/00 |

* cited by examiner

Primary Examiner—Karl D. Frech
(74) Attorney, Agent, or Firm—Oppenheimer Wolff & Donnelly LLP

(57) ABSTRACT

Systems and techniques are disclosed wherein a method of providing a security code for a document comprises applying a first magnetic feature capable of being read by a contactless magnetic reader and having a fixed magnetic signature selected from a set of magnetic signatures, and applying a second magnetic feature capable of being read by a contactless magnetic reader and characterized by its magnetic signature and its spatial location on the document. It is emphasized that this abstract is provided to comply with the rules requiring an abstract which allow a searcher or other reader to quickly ascertain the subject matter of the technical disclosure. It is submitted with the understanding that it will not be used to interpret or limit the scope or meaning of the claims.

27 Claims, 3 Drawing Sheets

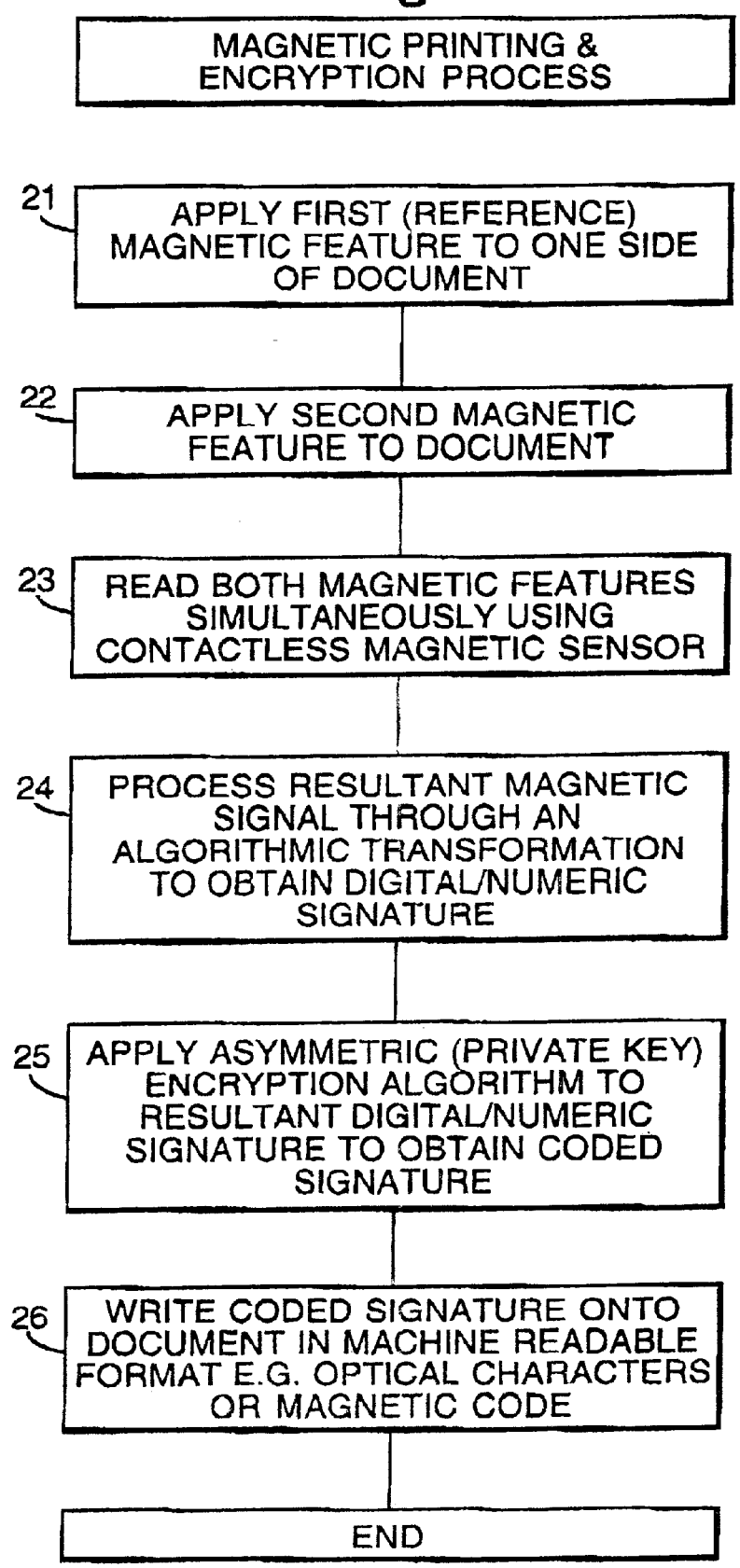

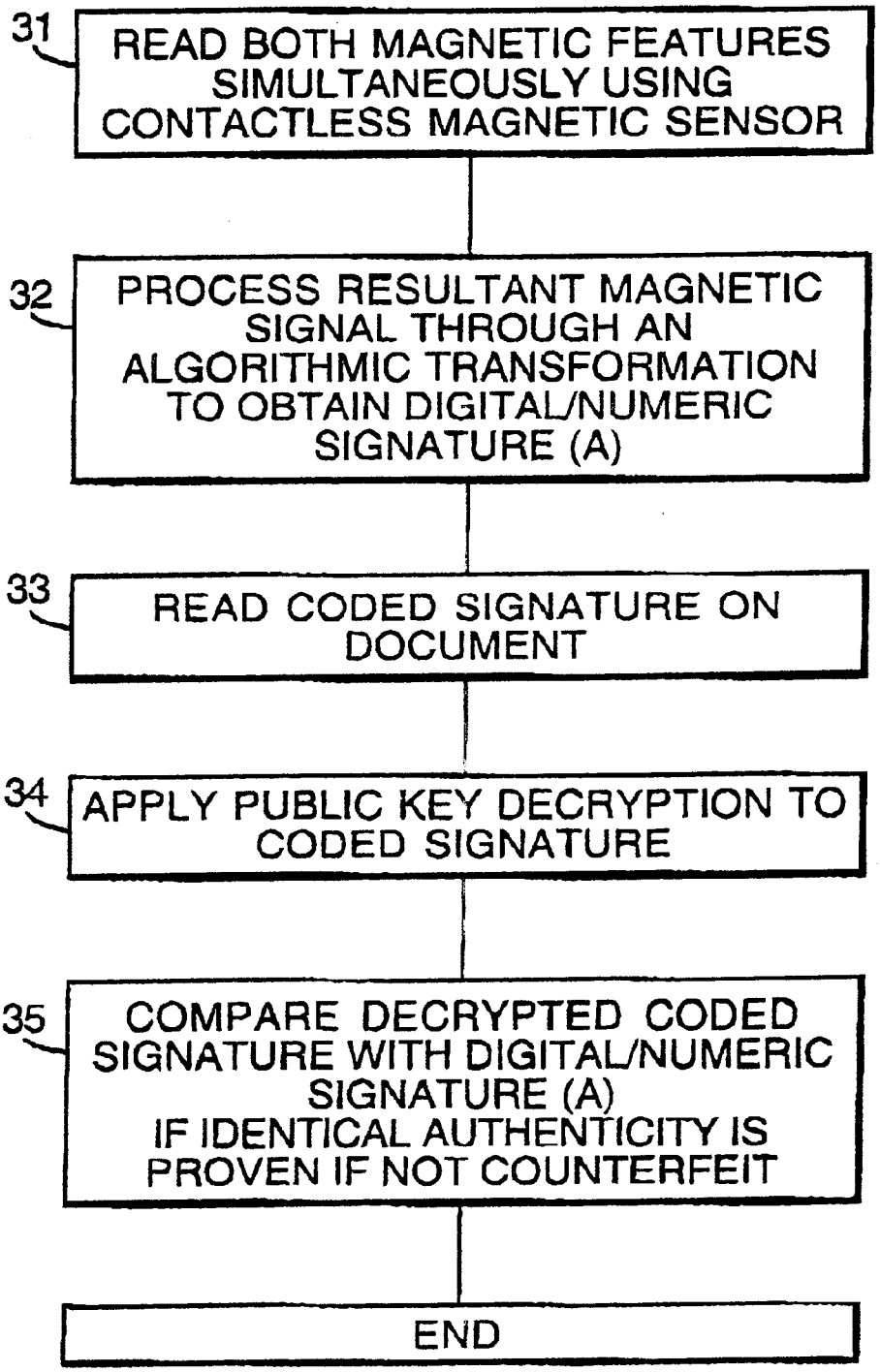

SECURITY DOCUMENTS

This application is a continuation of PCT/GB98/03417, filed Nov. 13, 1998.

This invention relates to security documents, e.g. banknotes. The invention will be described hereafter with particular reference to banknotes, but it will be understood that the invention is not limited to banknotes only.

There is already known a number of features using a range of technologies which may be embodied in banknotes to provide security. Many of these features are based upon magnetic and optical technologies. The objectives of these features are to reduce the potential for counterfeit and to assist in the machine readability for use in counters and authenticators.

Magnetic features used in banknotes to date have been based upon the use of magnetic inks (as in, for example, the US dollar) and the use of discrete segments of magnetic media (e.g. the magnetic thread used in UK banknotes). Such features are detected (i.e. sensed and/or read) in banknote counters and authenticators; basic machines merely serve to detect the presence of the feature whereas more complex machines are able to discriminate between notes of different denominations and carry out authentication tests on the banknotes.

According to one aspect of the present invention, there is provided a method of providing a security code for a document, e.g. a banknote, which comprises:

(i) applying to the document or to a precursor thereof a first magnetic feature which is capable of being read by a contactless magnetic reader and which has a fixed magnetic signature selected from a set of magnetic signatures each of which is characteristic of a given denomination or other characteristic of the document, said first magnetic feature being applied to a predetermined location of the document; and (ii) applying to the document or to a precursor of the document a second magnetic feature which is capable of being read by a contactless magnetic reader and which is characterised by (a) its magnetic signature and (b) its spatial location on the document, wherein the second magnetic feature is such that either one or both of its magnetic signature and its spatial location on the document is effected at random at the time of its deposition.

The term "precursor" in relation to the document includes within its scope partly fabricated documents, e.g. a laminar substrate.

In one embodiment of the invention, the method further comprises the steps of:

(iii) reading the magnetic signatures of said two magnetic features simultaneously;

(iv) subjecting the resultant magnetic signal to an algorithmic transformation to derive a digital or numerical signature; and (v) applying to the document or to a precursor of the document a further detectable feature corresponding to said digital or numerical signature to provide a means for checking the authenticity of the document.

In such a method, the digital or numerical signature may be subjected to an asymmetrical encoding algorithm to generate an encoded signature which is then used to determine the characteristics of said further detectable feature. This further detectable feature is preferably a magnetic feature; it may, for example, comprise a plurality of magnetic stripes.

Alternatively, the further detectable feature may be an optical feature.

Conveniently, the first magnetic feature is formed from a first magnetic material having a first coercivity and the second magnetic feature comprises a second magnetic material having a second coercivity.

At least one of said first and second magnetic features may be applied to the surface of the document. Equally, at least one of said first and second magnetic features may be incorporated into the body of the document. Suitable methods for applying a magnetic feature to the surface of the document include printing, coating or laminating processes. The features may also be applied by other methods, including (but not limited to) methods involving selective metallisation by electrodeposition, direct hot stamping onto the surface of the document, and vacuum deposition (e.g. using a mask or template to create a desired pattern of deposition). After application of the magnetic feature(s) to the document, the feature(s) may be modified by selective removal of part of the applied materials for example by means of chemical etching or by ablation techniques, e.g. using a laser. Additionally, parts of the deposited material may, if desired, be modified physically or chemically so as to alter their magnetic properties in a selective manner.

The first and second magnetic features may be applied to the same face of the document or to opposite faces thereof.

At least one of said first and second magnetic features may comprise an amorphous metal glass.

Where the random property of the second magnetic feature is its spatial location, this may be achieved by means of at least one random number generator which is arranged to control a servo motor which governs the registration between the document or its laminar precursor and an applicator device for depositing magnetic material. The applicator may, for example, be a printhead, a stamper, a laminator, a sputterer or a coating device.

Where the random property of the second magnetic feature is its random magnetic signature, this can be achieved by a variety of means. For example, a random number generator may be arranged to control the selection of a magnetic material from a plurality of magnetic materials, the selected material being applied to the document or its laminar precursor to form said second magnetic feature. Alternatively, a random number generator may be arranged to control the quantity of magnetic material which is applied to the document or its laminar precursor to form said second magnetic feature. A further possibility is to use a random number generator which is arranged to control a process for generating a magnetic material, e.g. by the selection of two or more components from a plurality of such components, which are brought together under conditions which generate a magnetic material, the generated magnetic material being applied to the document or its laminar precursor to form said second magnetic feature.

The method of the present invention may include further steps to form additional layers or coatings on the surface of the document. These may, for example, include a protective outer layer formed, for example, of a plastics material; and layers which modify the optical properties of the document, e.g. its reflectivity and/or its transparency. If desired, coating(s) may be applied to act as camouflage layers so that the presence of either or both of the magnetic features is less easily discerned (whether by the naked eye or to optical reading apparatus).

The invention also provides security documents, e.g. banknotes, which are produced by the methods of the invention.

According to a further aspect of the present invention, there is provided a security document, e.g. a banknote, which carries a first magnetic security feature which is selected from a predetermined set of features (for example, to indicate the denomination or value of the document); and a second magnetic security feature which is random and/or is unique to a given specimen document, characterised in that either one or both of (a) the magnetic signature and (b) the location of the second magnetic security feature are effected at random.

Such a banknote may include a further detectable feature derived from said first and second features.

As described hereinafter, the security features mentioned are all magnetic; it is to be understood, however, that the magnetic features described herein may be used in isolation or in conjunction with other, non-magnetic security features (for example, optical features). Both of these options fall within the scope of this invention.

The magnetic features in security documents (e.g. banknotes) in accordance with this invention are preferably susceptible of being detected (read) by contactless magnetic sensors; and digital encryption techniques may be used with these documents to achieve enhanced levels of security and authentication. The use of this technique will enable layered security levels to be employed, the ability to use each level being governed by access to relevant reading techniques and, if desired, encryption keys.

Documents in accordance with this invention may be used with magnetic sensors capable of reading magnetic features at a distance, i.e. features which are not in contact with the reading head. Two examples of technologies which allow this are Flying Null (see International Patent Specification No. WO96/31790) and Magneto-Resistive. It relates to the sensing of features which are printed, coated and or laminated onto one or the two faces of a banknote. These features may be read individually or in combination to provide a layered security facility.

The security features may be disposed on opposite faces of the document or they may be disposed on the same face of the document In one embodiment of this invention, magnetic patterns or features are applied on each face of the document. Since either or both of these can be read using a sensor of the kind described, successfully counterfeiting the banknote involves copying both the features and also achieving the correct spatial registration between them. As described below, further security can be provided by making one feature standard, and the other variable from note to note. As will be explained below, even higher levels of security can be obtained if each features is of different coercivity.

The invention is able to provide a layered security feature based on magnetic technology for use in banknotes and other documents with a face value. It makes use of the ability of recently developed sensors to read magnetic features remotely, that is, in a contactless manner. This ability allows the sensing of features on both faces of a document either individually or in combination.

The magnetic signatures may be printed, coated or laminated onto the face(s) of the document. Where the security features are both on the same face of the document, overprinting techniques may, for example, be used. In a typical embodiment using two magnetic features, these features would have substantially different coercivities; this makes it possible to measure one of the features only, or to measure both simultaneously.

In one embodiment of this invention, one face of the document may be of a reproducible standard, that is a fixed pattern or "signature" for any one denomination. The other security feature (e.g. on the other face of the document, or on the same face) could be random. Both features could extend over a significant proportion of the document. In a typical embodiment the layered security features would be achieved in manner illustrated in the accompanying drawings.

For a better understanding of the invention, and to show how the same may be brought into effect, reference will now be made, by way of example, to the accompanying drawings, in which:

FIG. 4 is a flow diagram illustrating one method in accordance with the invention for fabricating a document; and FIG. 5 illustrates how a document produced by the scheme of FIG. 4 may be read and/or authenticated.

Figure 1:
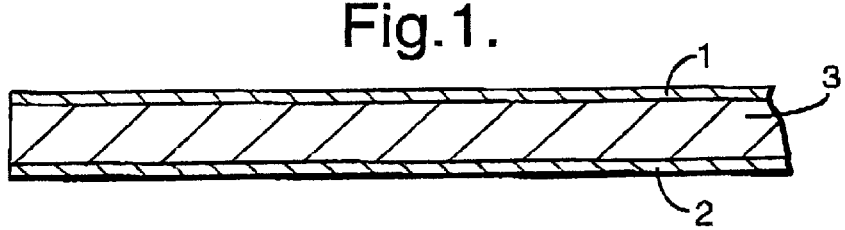
FIGS. 1, 2 and 3 illustrate different ways of locating the first and second security features on a is document such as a banknote.

In FIG. 1 the first magnetic security feature 1 is formed of a magnetic material having a lower coercivity than that of second magnetic security feature 2. As shown, the features 1 and 2 are present on opposite faces of substrate 3.

Figure 2:
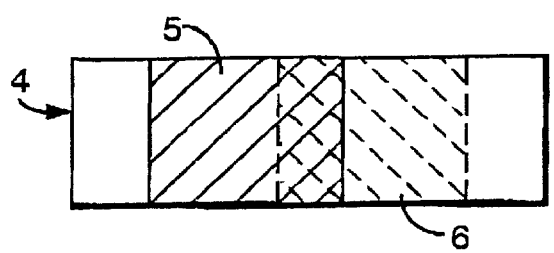
Figure 3:
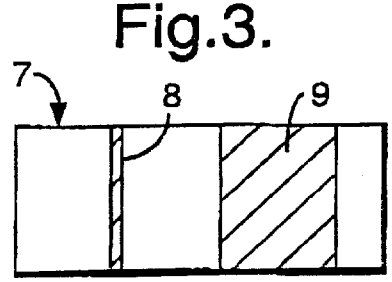

In FIG. 2, a banknote 4 has a first security feature 5 on one surface and a second security feature 6 on the opposite surface. In FIG. 3, a banknote 7 has a first security feature 8 in the form of a strip-like element which is coded to represent the denomination of the banknote; and a second security feature 9 (on the same side of the banknote) which gives a random response when read by an appropriate sensor, and therefore provides a unique signature for the document 7.

Security Level One

The standard (fixed) magnetic signature would be read with a contactless magnetic sensor sensitive to the lower coercivity feature, for example a Flying Null sensor with low gradient field. The document authenticator would read the magnetic signature and compare it with a standard set of signatures, decide what is the best match and make its assessment. This security level would be utilised in environments such as the back office of a retail store.

Security Level Two

At this level the magnetic sensor would read the combined signal of the two layers. This would be achieved by using, for example, a Flying Null sensor similar to that used in Security Level One but utilising a higher magnetic gradient field. The magnetic layer 2 would be produced so that its spatial relationship to magnetic layer 1 is not fixed i.e. random In this way the combined signal from both the magnetic layers will vary from one document to another even of the same denomination, When the document is produced the two magnetic signatures would be read simultaneously and the output encrypted using either symmetric or asymmetric encoding techniques. The encrypted signal would then be printed in matching-readable format onto the document. On verification this feature could be used in two ways:

firstly for lower levels of security the presence of the magnetic features on both faces could be determined, secondly for higher levels of security, the combined signature can be decoded and compared to the encrypted reference added at the time of manufacture.

Referring now to FIG. 4, the production of a security document, e.g. a banknote, having security features comprises a sequence of steps as depicted in boxes 21 to 26. A first (reference) magnetic feature is applied to one face of the document; then a second magnetic feature is applied either to the same face of the document as in step 21 or to the opposite face; the second magnetic feature has the properties set out hereinabove and the application of this second magnetic feature is effected using a "randomising" application process to achieve random location of the feature and/or a random magnetic signature for the second magnetic feature.

In step 23, a contactless magnetic reader (e.g. of the Flying Null type) is used to obtain an output from both first and second magnetic features simultaneously (in a single pass of the document over the reader). The resultant summed output is then processed as in box 24 to obtain a digital or numeric signature, which is then coded as in box 25 to produce a coded signature which is then applied to or written onto the document (step 26) in a machine-readable format, e.g. as optical characters or a magnetic code. This represents a third security feature which, by virtue of steps 23, 24 and 25, is derived from the magnetic properties and location of the first and second magnetic features.

FIG. 5 illustrates an authenticating or decryption process for a banknote produced by the method of FIG. 4. This involves the steps shown in boxes 31 to 35. First, a contactless magnetic reader (e.g. of the Flying Null type) is used to obtain an output from both first and second magnetic features of the banknote simultaneously (in a single pass of the document over the reader). The resultant output signal is then processed through an algorithmic transformation in box 32; this corresponds with the transformation of box 24 in FIG. 4. Next, the coded signature on the document (that produced by step 26 of FIG. 4) is read, and then decoded as in step 34 to derive a decrypted signature. This is then compared with output obtained from step 32: if these two parameters are the same, the authenticity of the banknote is proven. If they are different, then the banknote is counterfeit.

What is claimed is:

1. A method of providing a security code for a document, which comprises:
   (i) applying to the document or to a precursor of the document a first magnetic feature which is capable of being read by a contactless magnetic reader and which has a fixed magnetic signature selected from a set of magnetic signatures each of which is characteristic of a given denomination or other characteristic of the document, said first magnetic feature being applied to a predetermined location of the document; and
   (ii) applying to the document or to a precursor of the document a second magnetic feature which is capable of being read by a contactless magnetic reader and which is characterized by (a) its magnetic signature and (b) its spatial location on the document, wherein the second magnetic feature is such that either one or both of its magnetic signature and its spatial location on the document is effected at random at the time of its deposition.

2. A method according to claim 1, which further comprises the steps of:
   (iii) reading the magnetic signatures of said two magnetic features simultaneously;
   (iv) subjecting the resultant magnetic signal to an algorithmic transformation to derive a digital or numerical signature;
   (v) applying to the document or to a precursor of the document a further detectable feature corresponding to said digital or numerical signature to provide a means for checking the authenticity of the document.

3. A method according to claim 2, wherein said digital or numerical signature is subjected to an asymmetrical encoding algorithm to generate an encoded signature which is then used to determine the characteristics of said further detectable feature.

4. A method according to claim 2, wherein said further detectable feature is a magnetic feature.

5. A method according to claim 4, wherein said further magnetic feature comprises a plurality of magnetic stripes.

6. A method according to claim 2, wherein said further detectable feature is an optical feature.

7. A method according to claim 1, wherein the first magnetic feature is formed from a first magnetic material having a first coercivity and said second magnetic feature comprises a second magnetic material having a second coercivity.

8. A method according to claim 1, wherein at least one of said first and second magnetic features is applied to the surface of the document.

9. A method according to claim 8, wherein at least one of said first and second magnetic features is applied to the surface of the document by a printing, coating or laminating process.

10. A method according to claim 8, wherein said first and second magnetic features are applied to the same face of the document.

11. A method according to claim 8, wherein said firs and second magnetic features are applied to opposite faces of the document.

12. A method according to claim 1, wherein at least one of said first and second magnetic features is incorporated into the body of the document.

13. A method according to claim 1, wherein at least one of said first and second magnetic features comprises an amorphous metal glass.

14. A method according to claim 1, wherein the random spatial location of said second magnetic feature is achieved by means of at least one random number generator which is arranged to control a servo motor which governs the registration between the document or its laminar precursor and an applicator device for depositing magnetic material.

15. A method according to claim 14, wherein said applicator is a printhead, a stamper, a laminator, a sputterer or a coating device.

16. A method according to claim 1, wherein the random magnetic signature of said second magnetic feature is achieved by means of a random number generator which is arranged to control the selection of a magnetic material from a plurality of magnetic materials, the selected material being applied to the document or its laminar precursor to form said second magnetic feature.

17. A method according to claim 1, wherein the random magnetic signature of said second magnetic feature is achieved by means of a random number generator which is arranged to control the quantity of magnetic material which is applied to the document or its laminar precursor to form said second magnetic feature.

18. A method according to claim 1, wherein the random magnetic signature of said second magnetic feature is achieved by means of a random number generator which is arranged to control a process for generating a magnetic material, e.g. by the selection of two or more components from a plurality of such components, which are brought together under conditions which generate a magnetic material, the generated magnetic material being applied to the document or its laminar precursor to form said second magnetic feature.

19. A security document, e.g. a banknote, produced by the method according to claim 1.

20. A security document provided with a security code according to the method of claim 1.

21. A security document as claimed in claim 20, wherein said first and second security features are disposed on opposite faces of the document.

22. A security document as claimed in claim 20, wherein said first and second security features are disposed on the same face of the document.

23. A security document as claimed in claim 20, further comprising a further detectable feature derived from said first and second features.

24. A security document as claimed in claim 23, wherein the further detectable feature is a magnetic feature.

25. A security document as claimed in claim 20, wherein said first magnetic feature employs a magnetic material of a first coercivity, and second magnetic feature employs a magnetic material of a second coercivity significantly different from said first coercivity.

26. A security document as claimed in claim 20, wherein one of said first and second magnetic features employs two magnetic materials of different coercivity.

27. A security document as claimed in claim 20, wherein the spatial extents of said first and second security features are non-coterminus.

* * * * *